United States Patent
Al-Otaibi

(10) Patent No.: US 9,709,346 B2
(45) Date of Patent: Jul. 18, 2017

(54) CENTRALLY THREADED PLUG FOR HEAT EXCHANGER TUBE AND REMOVAL TOOL

(71) Applicant: Saudi Arabian Oil Company, Dhahran (SA)

(72) Inventor: Dhawi A. Al-Otaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/207,979

(22) Filed: Mar. 13, 2014

(65) Prior Publication Data

US 2014/0263337 A1    Sep. 18, 2014

Related U.S. Application Data

(60) Provisional application No. 61/780,572, filed on Mar. 13, 2013.

(51) Int. Cl.
| | | |
|---|---|---|
| B65D 43/04 | (2006.01) | |
| B65D 39/16 | (2006.01) | |
| F28F 11/02 | (2006.01) | |
| F16L 55/13 | (2006.01) | |
| B65D 43/26 | (2006.01) | |

(52) U.S. Cl.
CPC .............. *F28F 11/02* (2013.01); *F16L 55/13* (2013.01); *Y10T 29/49822* (2015.01)

(58) Field of Classification Search
CPC ...... F28F 11/02; F16L 55/13; Y10T 29/49822
USPC ........................ 220/284, 801; 215/355, 360
See application file for complete search history.

(56) References Cited

U.S. PATENT DOCUMENTS

| | | | | |
|---|---|---|---|---|
| 1,794,369 | A | | 3/1931 | Edgar |
| 2,355,492 | A | * | 8/1944 | White ........................ 215/360 |
| 2,439,628 | A | * | 4/1948 | Kopecky ..................... 215/360 |
| 4,390,042 | A | * | 6/1983 | Kucherer et al. ............ 138/89 |
| 4,446,673 | A | * | 5/1984 | Desthieux ..................... 53/467 |
| 4,653,540 | A | | 3/1987 | Epstein |
| 4,687,115 | A | * | 8/1987 | Bongiovanni ............... 215/355 |
| 4,800,637 | A | | 1/1989 | Overbay |
| 4,982,763 | A | * | 1/1991 | Klahn ............................ 138/89 |
| 5,109,997 | A | * | 5/1992 | Phillips ....................... 215/360 |

(Continued)

FOREIGN PATENT DOCUMENTS

| | | |
|---|---|---|
| DE | 90-02-162 | 4/1990 |
| GB | 2172080 | 9/1986 |

OTHER PUBLICATIONS

International Search Report and Written Opinion, Jul. 2, 2014.

*Primary Examiner* — Shawn M Braden
*Assistant Examiner* — Niki M Eloshway
(74) *Attorney, Agent, or Firm* — Abelman, Frayne & Schwab

(57) ABSTRACT

A tube plug insertable in one end of a heat exchange tube, the tube plug formed as an shaft having a distal part and an opposite proximal part which terminates in a proximal end with an threaded hole extending axially in the proximal end in the distal direction, and a plug removal tool having a proximal handle part and a distal stem part which has external threads that match threads in the threaded hole in the plug's shaft, the stem part being threadedly insertable into the threaded hole in the proximal end of the tube plug, whereby rotation of the stem will urge the tube plug to rotate relative to the heat exchange tube and break free from being lodged in the bore thereof.

15 Claims, 5 Drawing Sheets

(56) References Cited

U.S. PATENT DOCUMENTS

| | | | |
|---|---|---|---|
| 5,944,057 A | 8/1999 | Pierce | |
| 6,688,336 B2 | 2/2004 | Trichard | |
| 2004/0169001 A1* | 9/2004 | Leendersten et al. | 215/355 |
| 2006/0231520 A1* | 10/2006 | Van Cromvoirt | 215/355 |
| 2012/0118547 A1 | 5/2012 | Al-Otaibi | |

* cited by examiner

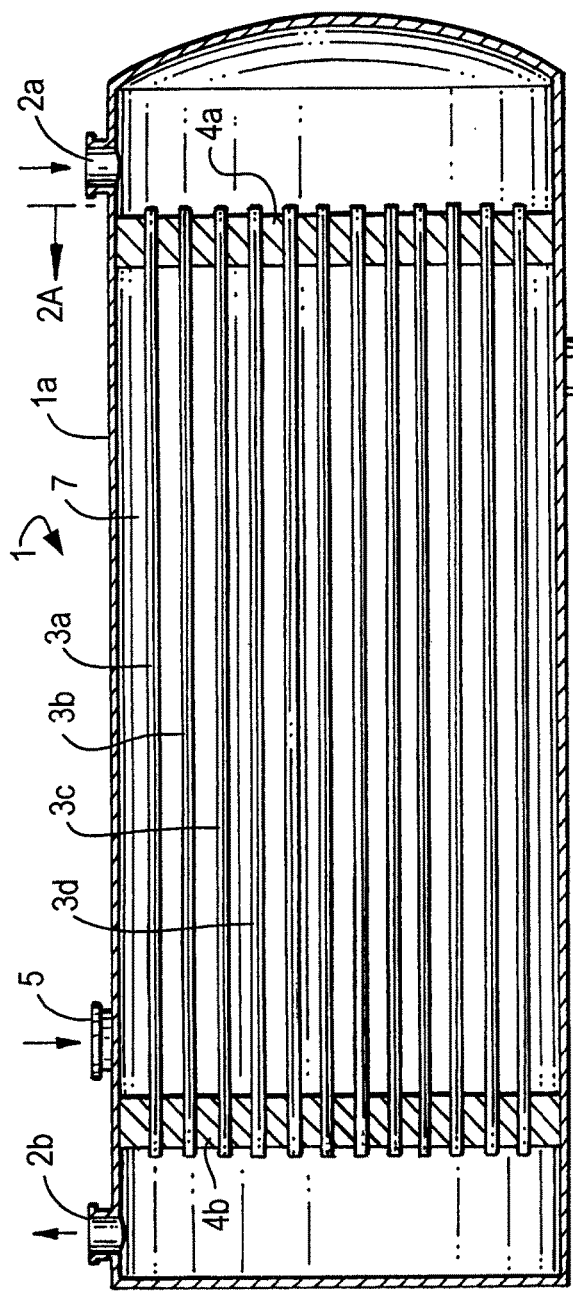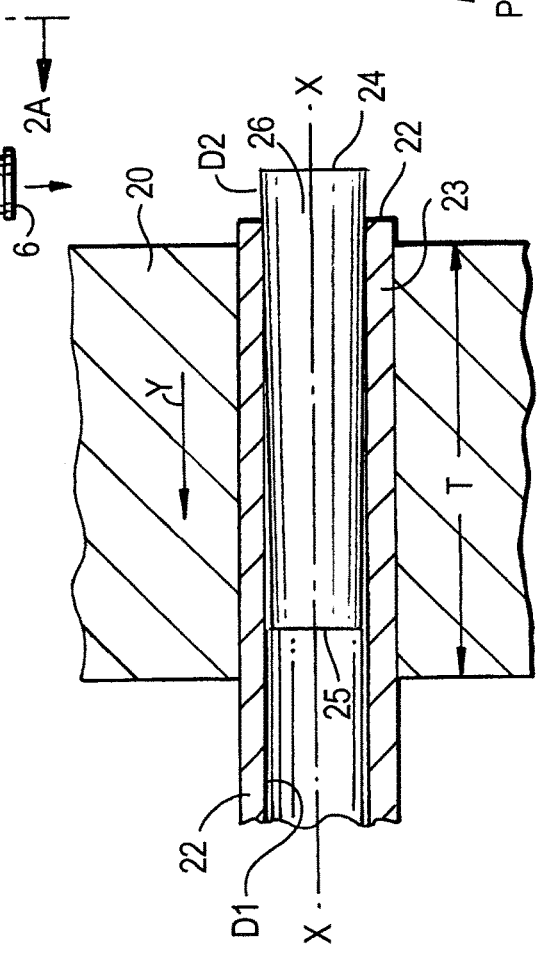
FIG. 1 PRIOR ART
FIG. 3 PRIOR ART

CENTRALLY THREADED PLUG FOR HEAT EXCHANGER TUBE AND REMOVAL TOOL

RELATED CASE

This patent application claims benefit under 35 USC Sections 119 and/or 120 of U.S. Provisional Application No. 61/780,572 filed Mar. 13, 2013 the contents of which are incorporated herein by reference.

I. BACKGROUND

A. Field of the Invention

This invention is in the field of tube plugs for heat exchange tubes used in heat exchangers, and particularly for tube plugs which tend to become tightly lodged in one end of a heat exchanger tube.

B. Discussion of Prior Art

This invention pertains to heat exchangers including shell and tube, air cooled, double pipe and other types. In conventional heat exchangers a plurality of heat exchange tubes are secured between opposing tubesheets with ends of the tubes tightly engaged in holes in the respective tubesheets. The ends of the heat exchange tubes are normally connected to the tubesheets using hydraulic expansion or hydraulic expansion and seal welding to achieve a fluid-tight seal intended to withstand extreme temperature and pressure changes of fluid flowing through said tubes and about the external surfaces of said tubes.

Exemplary patents in the prior art incorporated herein by reference disclose a variety of tube plugs for use with heat exchange tubes. Applicant's own co-pending published U.S. application, U.S. 2012/0118547 discloses a tube plug intended to stop fluid from accumulating at the tubesheet area and isolate this area from fluid stagnation which could result in corrosion. This tube plug includes a sealing flange at its distal end to be situated inwardly of the tubesheet.

Figure 4:
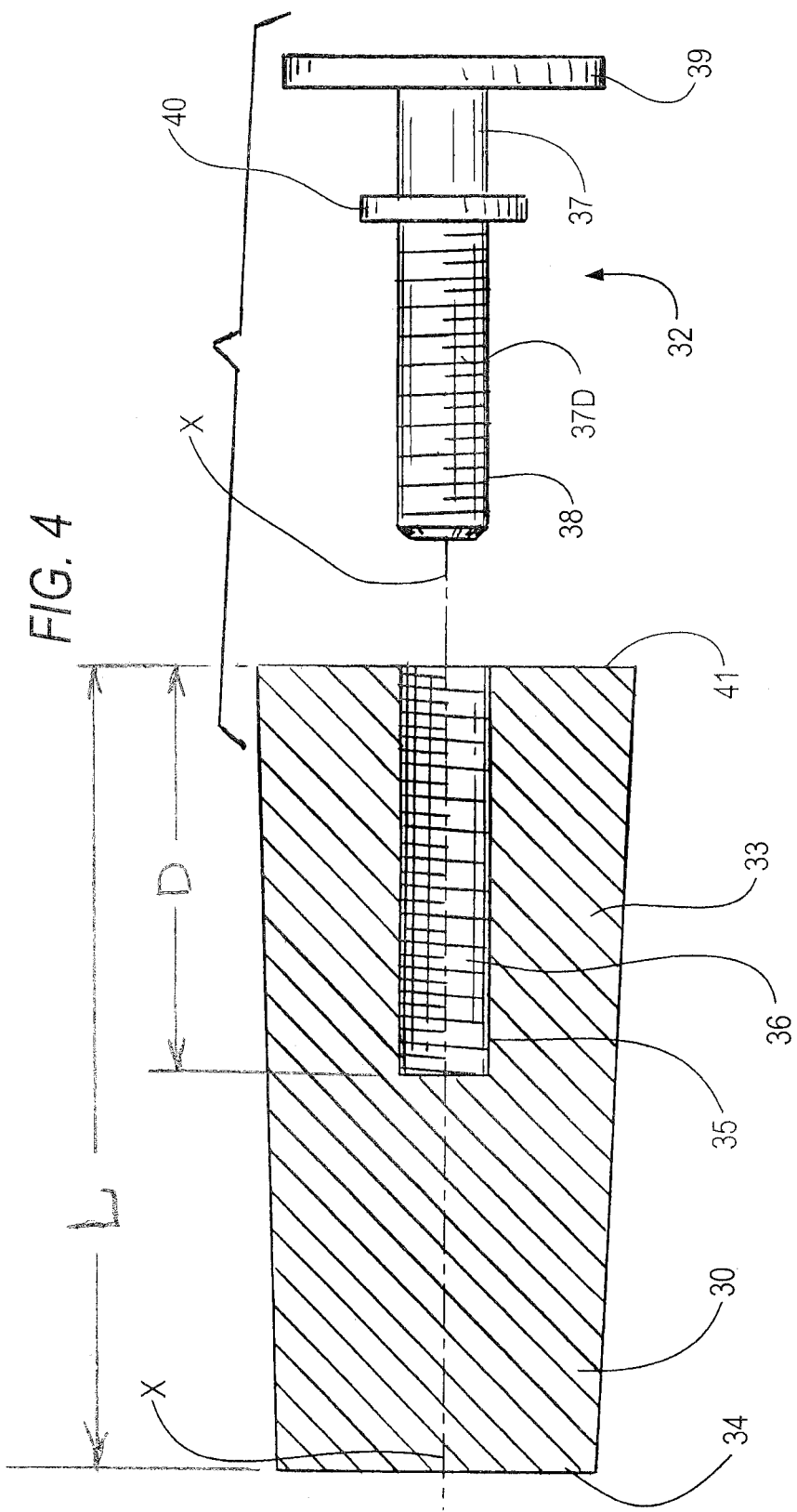

U.S. Pat. No. 4,800,637 to Overbay discloses a tube plug inserted in a heat exchange tube mounted in a tubesheet. As seen in FIGS. 1 and 4, bolt 50 has threaded engagement with force pad 52 and extends axially to the bottom distal closed flat end of tube plug 26. When bolt 50 is rotated its distal end presses against the distal flat inside end of tube plug 26 and stretches this plug for the purpose of reducing the plug's outer diameter so that it can be more easily pulled out of the heat exchange tube 14.

U.S. Pat. No. 1,794,369 to Edgar discloses a sealing plug composed of four segments 11 forming a circular tubular structure called spool 10, which is surrounded by an asbestos sleeve 13. Also, there is a central spindle 16 extending axially through spool 10. Rotation of tapered spindle 16 in the bore formed by segments 11 of spool 10, causes the segments to displace radially outward, which presses the cylindrical sleeve 13 really outward to form a better seal with the bore surface of the plastic tube into which spool 10 is inserted.

U.S. Pat. No. 4,653,542 to Epstein discloses a tube plug 10 with a threaded bore surface 28 which receives mating threads 72 of insert 14. This insert is screwed into the proximal end of tube plug 10 at its tapered area 68 as seen in FIGS. 1, 4 and 5. The insert deflects the thin proximal end walls of tube plug 10 radially outward to press and seal against the bore surface of the heat exchange tube 24.

U.S. Pat. No. 5,944,057 to Pierce discloses a holding member 14 which has a smooth cylindrical outer surface that is driven into the central bore of tube plug 12 to expand the plug into better sealing engagement with the bore of the open end of the heat exchange tube 22.

U.S. Pat. No. 6,688,336 to Trichard discloses the concept of rotating a tube plug; however, this reference requires external threads on the tube plug to engage and cut into the bore of the plugged tube which is a relatively soft plastic, this device thus being not applicable to hard steel heat exchange tubes.

None of the above described prior art tube plugs pertain to the problem addressed by the present invention namely removal of a tube plug which is lodged, fused, wedged or otherwise bound in and with the proximal end of a heat exchange tube in a heat exchanger or furnace.

In the operation of heat exchangers, problems may occur from pin holes, cracks, clogging or other fluid seal issues in heat exchange tubes. Such tubes need to be taken out of service and isolated from the heat exchanger operation to prevent further problems with these tubes, and to allow the heat exchanger to continue operation without these defective tubes. The conventional approach is to insert a tapered solid metal plug in each of the opposite ends of a defective tube. Such a plug is forcefully driven into the open tube end until there is a fluid-tight interference fit. This kind of repair can be done in the field or elsewhere, but is intended to provide a quick and relatively inexpensive solution, with the expectation that the tube plug and defective tube may be removed at a later date and a new replacement tube installed.

The present invention pertains particularly to situations where a conventional tube plug must be removed from its installation in the end of a heat exchange tube. Due to the original interference fit, corrosion, heat changes which may be extreme and other factors during the operation of the heat exchanger, it is common for such conventional tube plugs when employed, to become so tightly lodged in the ends of the tubes that removal is extremely difficult. The current plug removal practice is by hammering the exposed plug head in left and right and up and down directions until the plug has broken free from the bore of the heat exchange tube. This procedure often enlarges and damages the tubesheet hole, so that future re-use of the tubesheet will be difficult for attachment and sealing a tube-to-tubesheet junction. Damaged tubesheet holes are difficult to repair, and replacement costs are not only expensive but require taking the entire heat exchanger out of service which impacts a much larger operation.

The present invention addresses the above-described problems as regards damage to heat exchange tubes and to tubesheets resulting from conventional removal operation of conventional tube plugs and the undesirable results in cost, down-time and inconvenience.

II. OBJECTS AND SUMMARY OF THE INVENTION

The invention presented herein provides a new tube plug that will facilitate subsequent removal when necessary and protection of tubesheet joints from damage and leakage, and will reduce the necessity to replace whole tubesheets. More particularly an objective is to protect the tubesheet and holes from severe enlargement and damage caused by hammering conventional plugs during their removal.

The new tube plug is a solid metal rod slightly tapered from its proximal end to its distal end which is inserted into the heat exchange tube, but has the additional feature of a central hole bored in the proximal end and threaded. In use the new plug is axially driven into an open end of a heat exchange tube in the normal way. Within the scope of this invention it is also possible to modify a conventional plug by drilling a hole in its proximal end and threading same as mentioned above.

The second part of this invention is a screw handle which is used to remove the new plug without hammering in directions transverse of the plug's longitudinal axis. The handle is attached to the proximal end of a threaded rod whose threads match those of the threaded hole in the tube plug. The threaded rod is threadedly inserted into the threaded hole of the tube plug and rotated clockwise until it is fully seated or bottoms out or is otherwise barred from further rotation. The handle is then rotated further clockwise which urges the lodged tube plug to break free from the bore of the heat exchange tube. Obviously, counter-clockwise screw threads could be used.

Advantages Of The New Invention Include:

1. Internally threaded plugs are easy to fabricate from raw solid material.
2. Such plugs are easy to install and fix in the field.
3. Such plugs extend the operation cycle life of the heat exchanger by protecting the tube sheet from severe corrosion and damage caused by hole enlargement during plug removal by hammering.
4. The cost of new tube sheet material and fabrication is avoided by protecting the tube sheet holes from enlargement and damage.
5. There is a substantial saving obtained from rapid plug fabrication and field installation, thus extending exchanger operation cycle and avoiding plant production loss.

In view of the above is an object of the present invention to provide an improved tube plug which can be removed when necessary without conventional hammering of the exposed proximal end of the tube plug by up-and-down and left and right strikes from a hammer tool.

A further object of the present invention is to provide an improved tube plug which can be removed by rotating the tube plug relative to the bore surface of the heat exchange tube to which it has become lodged.

An additional object is to provide an improved tube plug combination with a removal tool which engages only the exposed proximal end of the tube plug.

Another object is to provide a combination as described above where said removal tool engages the exposed proximal end of the tube plug by its threaded stem inserted into a threaded hole in the proximal and of the tube plug.

A still further object is to provide a combination as described above where the distal end of the removal tube is inserted into the threaded hole in the proximal end of the tube plug and is barred from further rotation by a stop element; further rotation of the removal tool urges the tube plug to rotate and break free from its connection to the bore surface of the heat exchange tube.

Another object is to provide for the tube plug combination described above, a stop element which comprises a flange on said removal tool which bars further insertion and further rotation of its threaded stem in said threaded bore of said tube plug.

A further object is to provide for the tube plug combination described above a stop element which comprises a foot extending axially from its distal end for engagement with the closed bottom and of the threaded borehole in the tube plug.

A still additional object is to provide for the tube plug combination described above a stop element which comprises a limited length of threads in said threaded borehole in said tube plug which limits the extent to which the threaded stem of the removal tool can be inserted and rotated relative to the tube plug.

A still further object is to provide a method for breaking the bond of a tube plug lodged in the bore of one end of a heat exchange tube, comprising the steps:

a. forming a threaded hole in the proximal end of said tube plug, b. inserting in said threaded hole a mating threaded stem of a tube plug removal tool, c. providing with said removal tool a stop element (i) to allow rotation of said threaded stem and axial traverse thereof a predetermined amount, and (ii) then to bar further rotation of said stem of said removal tool relative to said tube plug, and d. applying further rotative force to said removal tool to break said bond of said tube plug with said bore surface of said heat exchange tube.

An additional object is to provide a method as described above where barring further rotation of said stem comprises forming a shoulder on said stem intermediate the ends thereof to engage said proximal end of said tube plug.

An additional object is to provide a method is described above where barring further rotation of said stem comprises forming an axially extending foot at the distal end of said stem to engage the bottom wall of said threaded hole, thus blocking further rotation of said stem.

A still further object is to provide a method as described above where barring further rotation of said stem comprises forming threads in said threaded hole to have limited axial depth therein thus barring further rotation of said stem after it has reached said limited axial depth.

A still further object is to provide a method as described above comprises providing a handle extending radially outward from said stem, providing a lever for rotation of said stem.

By implementing this improved plug, the concern of damage to heat exchange tubes and tubesheets will be greatly reduced or eliminated. Also, the cost of a new tubesheet as a replacement for the defective one, repair expenditures and operation production loss will be minimized or avoided. Using this new tube plug configuration will ensure that the tubesheet remains in reliable condition. Also, it will help to protect the heat exchange tube ends for future use in case sleeve repair option is considered.

III. BRIEF DESCRIPTION OF THE DRAWINGS

Figure 2A:
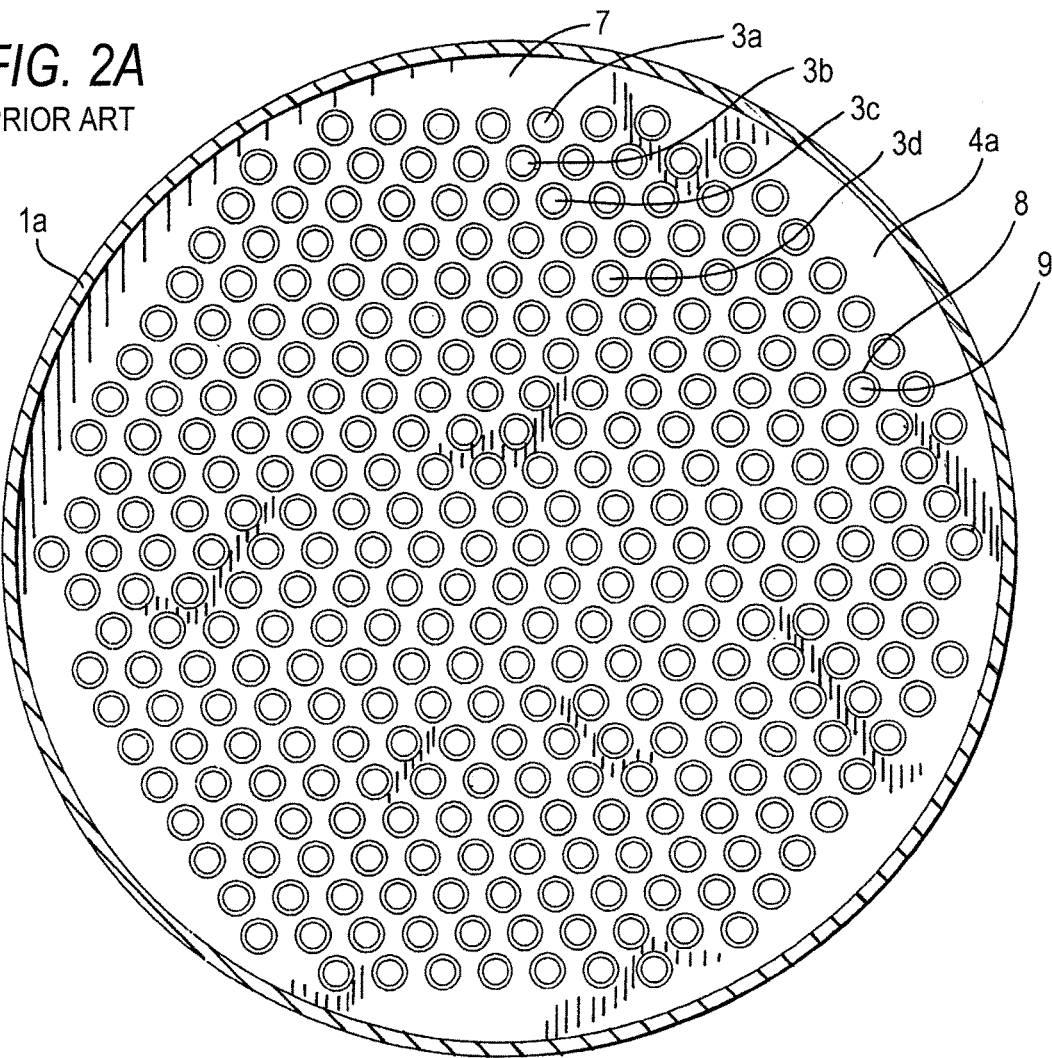
Figure 2B:
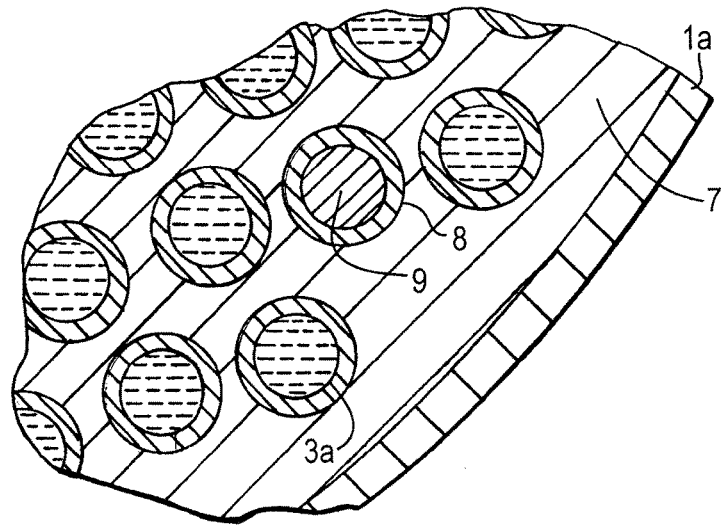
Figure 5A:
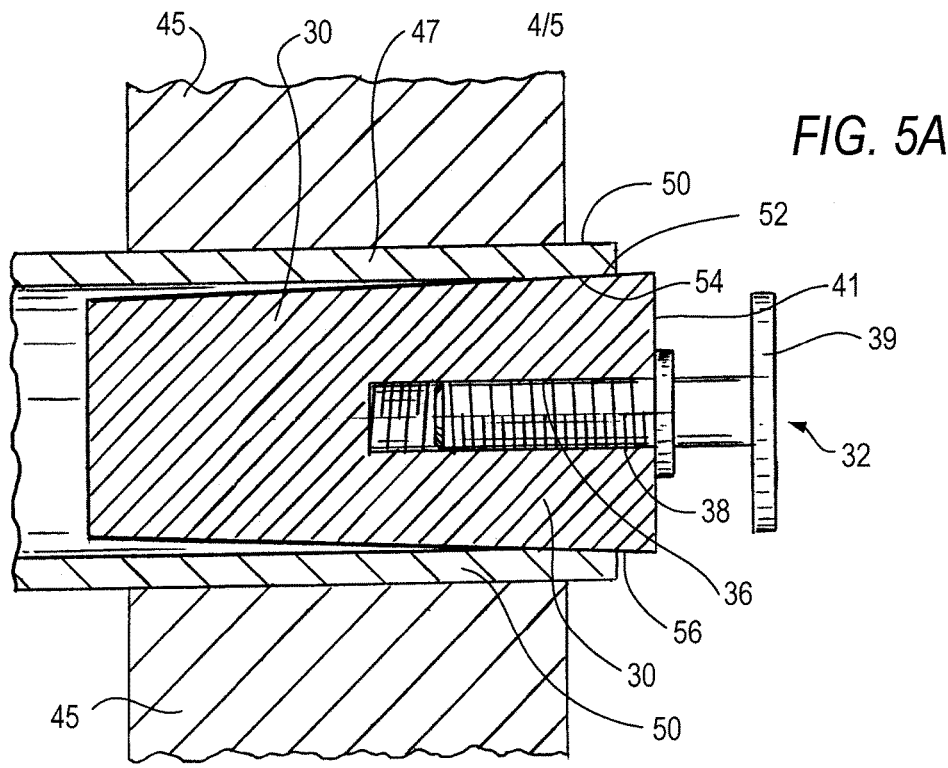
Figure 5B:
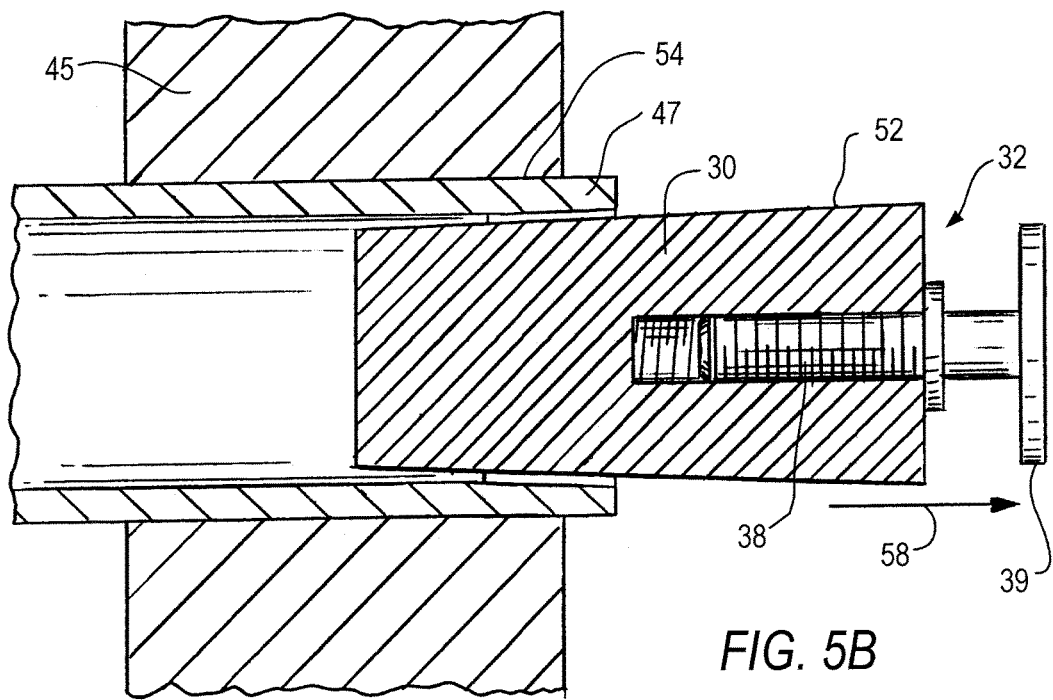
Figure 7:
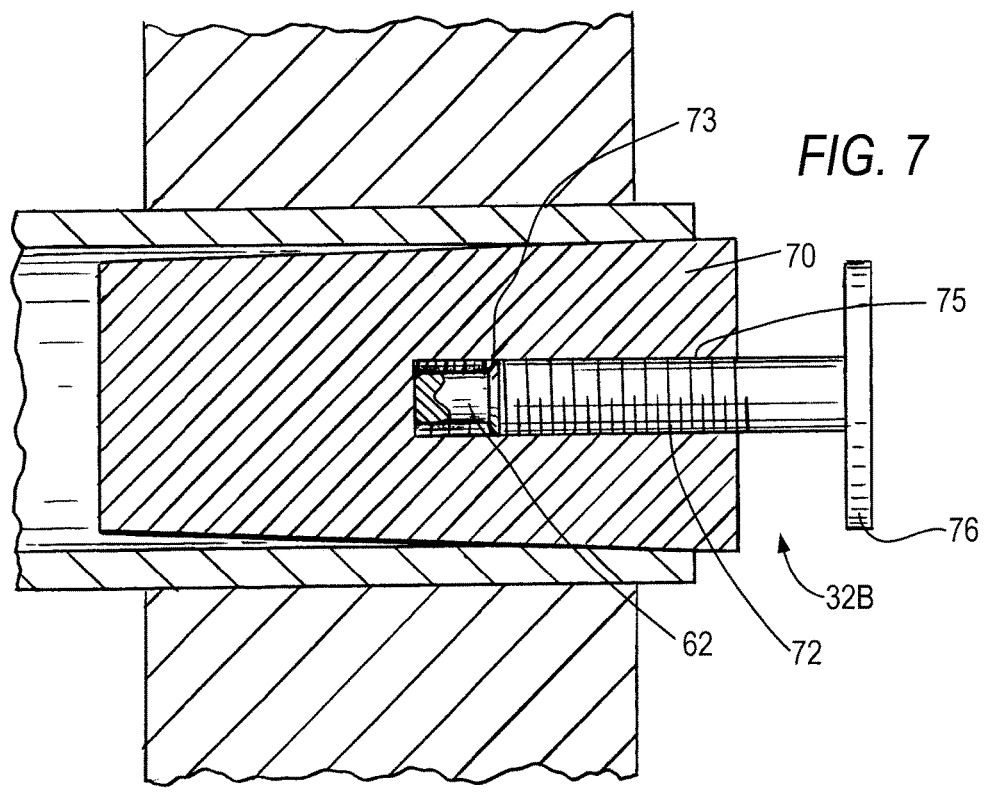
Figure 6:
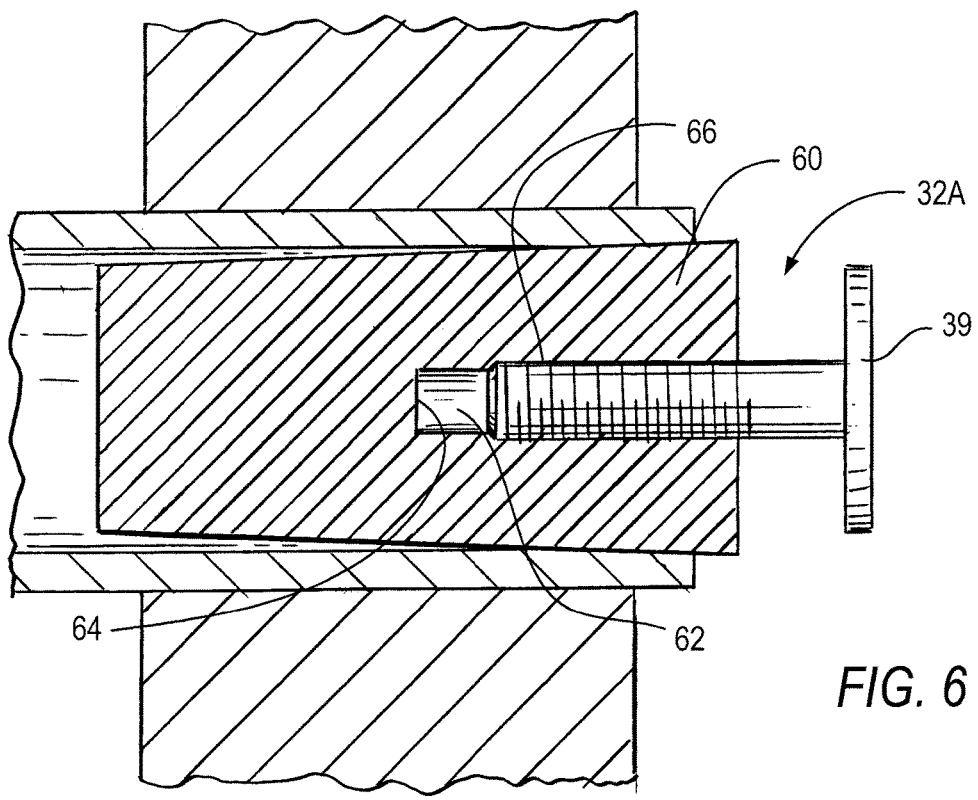

The invention will be further described in detail in conjunction with the accompanying drawings in which:

FIG. 1 is a side elevation view of a conventional prior art heat exchanger,

FIG. 2A is an elevation view in section taken along line 2A-2A in FIG. 1 showing an outer surface of a tubesheet where the ends of representative heat exchange tubes are shown as circles, FIG. 2B is an enlarged fragmentary view taken from FIG. 2A showing the ends of the representative heat exchange tubes, FIG. 3 is a fragmentary side elevation view in section of a prior art tube plug in a heat exchange tube extending through a tubesheet, FIG. 4 is a side elevation enlarged view of a first embodiment of the new tube plug and removal tool of the present invention, FIG. 5A is an enlarged fragmentary side elevation view in section of the embodiment of FIG. 4 installed in a heat exchange tube, FIG. 5B is similar to FIG. 5A showing the tube plug being removed from a heat exchange tube, FIG. 6 is similar to FIG. 5A showing a second embodiment of the new tube plug, and FIG. 7 is similar to FIG. 5A showing a third embodiment of the new tube plug.

IV. DETAILED DESCRIPTION OF THE PREFERRED EMBODIMENTS

To facilitate an understanding of the invention, the same reference numerals have been used, when appropriate, to designate the same or similar elements that are common to the figures. Unless stated otherwise the features shown and described in the figures are not drawn to scale, but are shown for illustrative purposes only.

FIG. 1 shows a heat exchanger 1 including its shell is containing a plurality of generally parallel heat exchange tubes 3a, 3b, 3c, 3d extending axially between inlet 2a and outlet 2b. Each tube has its proximal end extending through and fixed to tubesheet 4a, and its distal end extending through and fixed to tubesheet 4b.

FIG. 2a shows the end face of the tubesheet 4a with its large number of transverse holes. In each hole the proximal end of one heat exchanger tube is tightly secured by conventional means, with four representative tubes 3a-3d so labeled. Tube 8 is shown with a tube plug 9 secured in its open end. FIG. 2b is an enlarged fragmentary view of the tubesheet of FIG. 2a showing ends of the representative heat exchange tubes, exemplified by tubes 3a and 8.

Representing heat exchanger and a prior art tube plug, FIG. 3 shows in fragmentary side elevation sectional view a segment of a tubesheet 20 of thickness T, a single representative heat exchange tube 22 having central longitudinal axis X-X, and a conventional tube plug 24 in the proximal end 23 of heat exchange tube 22. This tube's proximal end 23 extends transversely through tubesheet 20 and is fixed thereto by conventional means such as hydraulic expansion and/or welding. Heat exchange tube 22 extends axially inward of tubesheet 20 in the distal direction indicated by arrow Y. Tube plug 24 is tapered to produce a tight interference or friction fit in the general area 26 where the tube plug's outer diameter D2 at its proximal end is greater than bore diameter D1 of heat exchange tube 22, and the plug's outer diameter at its distal end is smaller than the bore diameter D1 of heat exchange tube 22.

FIG. 4 illustrates schematically the new centrally threaded tube plug 30 for an exchange tube with its mating removal tool 32. Tube plug 30 is a round cylindrical shaft of length L tapered from its proximal end 33 to a smaller diameter at its distal end 34, with a central bore hole 35 along central axis X-X of depth D, the bore having internal threads 36. Removal tool 32 comprises stem part 37 having external threads 38 that match the internal threads 36 in plug 30. At the proximal end of removal tool is a transversely extending handle 39 employed for rotating the tool when its stem part 37 is threadedly inserting into the threaded bore 35 of tube plug 30. A stop element 40 is situated intermediate said distal threaded portion 37D and said proximal handle 39 of the removal tool, this stop element having the form of a flange which, when it engages proximal surface 41 on tube plug 30, will bar further rotation of the insertion tool relative to plug 30. Further rotation of handle 39 will urge plug 30 to rotate and break free from its lodged, fused or otherwise restrained coupling in the bore of a heat exchange tube.

FIGS. 5A-5B, 6 and 7 illustrate three embodiments of the new tube plug and removal tool, where FIGS. 5A-5B correspond to the embodiment illustrated in FIG. 4, and FIGS. 6 and 7 illustrate variations thereof.

FIG. 5A is a fragmentary elevation view showing schematically in section tubesheet 45 in which has been secured heat exchange tube 47. A first embodiment of the new centrally threaded tube plug 30 is shown installed in the proximal end 50 of heat exchange tube 47, where an external area 52 of the tube plug is in an interference fit with an adjacent bore surface 54 of heat exchange tube 47 and is tightly lodged thereto. Removal of this tube plug without having to hammer its proximal end 56 in up, down, left and right directions will be done by using removal tool 32 where it's threaded stem 38 is screwed into centrally threaded bore 36 in the proximal end of tube plug 30 until stop flange 40 engages the proximal end surface 41 of plug 30. This engagement bars further rotation of removal tool 32 relative to tube plug 30. As described earlier, further rotation of handle 39 of removal tool 32 will urge tube plug 30 to rotate relative to heat exchange tube 47 and break free of its attachment in area 52 of the tube plug and area 54 of heat exchange tube bore surface for axial removal in the direction of arrow 58, as seen in FIG. 5B.

FIG. 6 illustrates a second embodiment of the new tube plug 60 which is similar to that of FIG. 5A, but has a different structure to bar further rotation of removal tool 32A relative to tube plug 60. Instead of a flange situated intermediate the ends of the removal tool 32 seen in FIG. 5A, this FIG. 6 removal tool embodiment 32A has a projecting foot 62 at its distal end. When foot 62 engages the transverse bottom wall 64 of bore hole 66, further rotation of removal tool 32A relative to plug 60 will be barred. As with the earlier described embodiment, further rotation of handle 39 of removal tool 32A will then urge plug 60 to rotate and break free from the fused or otherwise lodged engagement with the bore surface of heat exchange tube.

FIG. 7 illustrates a third embodiment 70 of the new centrally threaded tube plug which omits both the previously described flange stop element 40 and the projecting foot stop element 62 in the embodiments of FIG. 5A and FIG. 6 respectively, and instead employs a limited length of threads 72 in the bore surface of tube plug 70. When the threaded stem 75 of removal tool 32B reaches the end of threads in area 73 in the bore hole of plug 70, removal tool 32B can no longer rotate. As earlier described, further rotation of the handle 76 of the removal tool 32B will urge the tube plug 70 to rotate and break free from its fixed engagement in the bore of a heat exchange tube.

In the above embodiments the central threaded hole may vary, but in one preferred embodiment the hole has a ten mm diameter, an appropriate thread gauge and hole depth. The new tube plug will be made preferably of steel of composition selected on factors such as: (a) the material of the heat exchange tube, (b) the characteristics of fluid that may be used in the heat exchange tube, (c) the temperatures and pressures encountered in such heat exchange tube, (d) the life expectancy thereof, (e) the costs, etc. Where a typical tube sheet has thickness T of about two inches, the new tube plug would have length of approximately T inches. An exemplary removal tool would be composed of steel, and its handle would extend in the perpendicular direction relative to the central axis of the removal tool's stem part. Such stem would have diameter $D_s$ and its handle would have a diameter $D_h > D_s$.

Advantages of the new tube plug include:
1. Being easy to fabricate from raw solid material,
2. Being easy to install in a factory or in the field,
3. Extending the operation cycle life of the heat exchanger by protecting the tubesheet from severe corrosion and damage caused by hole enlargement during conventional plug removal by hammering,
4. Eliminating the cost of new tubesheet material and fabrication by protecting the tubesheet holes from enlargement and damage, and
5. Providing substantial economic saving by rapid plug fabrication and field installation, thus extending the heat exchanger operation cycle and avoiding temporary plant production shutdown loss.

Although various embodiments that incorporate the teachings of the present invention have been shown and described in detail above, those of ordinary skill in the art can readily devise other and varied embodiments, and the scope of the invention is to be determined by the claims that follow.

The invention claimed is:

1. A tube plug insertable into one end of a heat exchange tube, comprising:
   a. a solid metal one-piece elongated shaft having length L, a distal part and an opposite proximal part which terminates in a proximal end with an elongated threaded hole extending axially into said proximal part in the distal direction to a depth D distance less than L, said shaft being tapered on its outer surface from said proximal end to said distal part such that said distal part has smaller diameter than said proximal part, with said outer surface having a fixed dimension at each axial location along the length of said solid shaft, and
   b. a removal tool having (i) a handle part and a stem part extending in the distal direction which stem part has external threads that match threads in said threaded hole in said plug's shaft, said stem part being threadedly insertable in a first rotation direction a predetermined axial distance into said threaded hole in said proximal end of said tube plug, and (ii) a stop element situated on said stem part for barring further rotation in said first rotation direction of said stem part relative to said shaft after said stem part is threadedly inserted said predetermined distance into said threaded hole of said shaft,
   c. where further rotation of said stem part in said first rotation direction will urge said tube plug to rotate in said first rotation direction relative to said heat exchange tube.

2. The tube plug according to claim 1 where said stop element comprises a flange extending radially outward of said stem part and located proximally of said threaded part of said stem for engaging said proximal end of said shaft.

3. A tube plug insertable into one end of a heat exchange tube, comprising:
   a. solid metal elongated shaft having length L, a distal part and an opposite proximal part which terminates in a proximal end with a threaded hole extending axially into said proximal end in the distal direction to a depth D distance less than L, said shaft being tapered on its outer surface from said proximal end to said distal part such that said distal part has smaller diameter than said proximal part, and
   b. a removal tool having (i) a handle part and a stem part extending in the distal direction which stem part has external threads that match threads in said threaded hole in said tube plug's shaft, said stem part being threadedly insertable in a first rotation direction a predetermined axial distance into said threaded hole in said proximal end of said tube plug, and (ii) a stop element situated on said removal tool stem part for barring further rotation in said first rotation direction of said stem part relative to said shaft after said stem part is threadedly inserted said predetermined distance into said threaded hole of said shaft, where said threaded hole is defined by threaded bore walls and a distal end wall, said stop element comprises a foot extending distally on said stem part for engaging the distal end wall of said thread hole,
   c. where further rotation of said stem part in said first rotation direction will urge said tube plug to rotate in said first rotation direction relative to said heat exchange tube.

4. The tube plug according to claim 3 where said threads of said threaded hole are configured to allow insertion of said externally threaded stem a predetermined axial distance and to then bar further rotation of said stem relative to said shaft.

5. The tube plug according to claim 3 where said handle part has a proximal part extending transversely of said shaft.

6. The tube plug according to claim 5 where said proximal part of said handle part extends generally perpendicularly to said stem part.

7. A tube plug insertable into one end of a heat exchange tube, comprising:
   a. a solid one-piece metal elongated shaft having length L, a distal part and an opposite proximal part which terminates in a proximal end with a threaded hole extending axially into said proximal end in the distal direction to a depth D distance less than L, said shaft being tapered on its outer surface from said proximal end to said distal part such that said distal part has smaller diameter than said proximal part, and
   b. a removal tool having (i) a handle part and a stem part extending in the distal direction which has external threads that match threads in said threaded hole in said plug's shaft, said stem part being threadedly insertable in a first rotation direction a predetermined axial distance into said threaded hole in said proximal end of said tube plug, and (ii) a stop element situated on said removal tool stem part for barring further rotation in said first rotation direction of said stem part relative to said shaft after said stem part is threadedly inserted said predetermined distance into said threaded hole of said shaft,
   c. where further rotation of said stem part in said first rotation direction will urge said tube plug to rotate in said first rotation direction relative to said heat exchange tube, where said threaded hole is defined by threaded bore walls and a distal end wall, said stop element comprises a foot extending distally on said stem part for engaging the distal end wall of said threaded hole, and
   d. where said tube plug's threaded hole is threaded along its entire depth D, and said handle stem part is threaded from its distal end a length at least as long as said depth D.

8. The tube plug according to claim 1 for a heat exchange tube having a central bore of diameter D1, and where said tube plug has an outer diameter at said proximal end greater than D1, and an outer diameter at said distal end less than D1.

9. The tube plug according to claim 1 where said tube plug's shaft comprises solid steel.

10. The tube plug according to claim 1 where said shaft has a round cylindrical outer space, and said threaded hole extends centrally of said shaft.

11. A method for breaking the bond of a tube plug lodged in the bore of one end of a heat exchange tube where said tube plug is tapered on its outer surface from its proximal end to a smaller diameter distal end, comprising the steps:
   a. forming a threaded hole in said proximal end of said tube plug, inserting in said threaded hole a mating threaded stem of a tube plug removal tool,
   b. providing with said removal tool a stop element (i) to allow rotation of said threaded stem and axial traverse of said threaded stem in said threaded hole a maximum predetermined distance, and (ii) then to bar further rotation of said threaded stem of said removal tool relative to said tube plug, and
   c. applying further rotative force to said removal tool to break said bond of said tube plug with said bore surface of said heat exchange tube.

12. A method according to claim 11 wherein barring further rotation of said stem comprises forming a shoulder on said stem intermediate the ends thereof to engage said proximal end of said tube plug.

13. A method according to claim 11 wherein barring further rotation of said stem comprises forming an axially extending foot at the distal end of said stem to engage the bottom wall of said threaded hole, thus blocking further rotation of said stem.

14. A method according to claim 11 wherein barring further rotation of said stem comprises forming threads in said threaded hole to have limited axial depth therein thus barring further rotation of said stem after it has reached said limited axial depth.

15. A method according to claim 11 further providing a handle extending radially outward from said stem, providing a lever for rotation of said stem.

\* \* \* \* \*